United States Patent
Zhang et al.

(10) Patent No.: US 11,503,585 B2
(45) Date of Patent: Nov. 15, 2022

(54) JOINT TRANSMISSION CONFIGURATION INDICATOR (TCI) INDICATION FOR SINGLE-CHANNEL TCI

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/248,111

(22) Filed: Jan. 8, 2021

(65) Prior Publication Data

US 2022/0225298 A1 Jul. 14, 2022

(51) Int. Cl.
*H04W 72/04* (2009.01)
*H04L 5/00* (2006.01)
*H04L 41/0803* (2022.01)

(52) U.S. Cl.
CPC ......... *H04W 72/042* (2013.01); *H04L 5/0048* (2013.01); *H04L 41/0803* (2013.01); *H04W 72/046* (2013.01)

(58) Field of Classification Search
CPC H04W 72/042; H04W 72/046; H04L 5/0048; H04L 41/0803
See application file for complete search history.

(56) References Cited

U.S. PATENT DOCUMENTS

| | | | |
|---|---|---|---|
| 2021/0337547 A1* | 10/2021 | Rahman | H04W 72/1289 |
| 2021/0385807 A1* | 12/2021 | Rahman | H04W 72/0406 |
| 2022/0104043 A1* | 3/2022 | Farag | H04W 24/10 |

* cited by examiner

*Primary Examiner* — Duc C Ho
(74) *Attorney, Agent, or Firm* — Harrity & Harrity, LLP

(57) ABSTRACT

Various aspects of the present disclosure generally relate to wireless communication. In some aspects, a user equipment (UE) may receive transmission configuration indicator (TCI) information relating to a common beam TCI indication, the TCI information relating to a plurality of channels or reference signals. The UE may selectively transmit or receive one or more channels or reference signals of the plurality of channels or reference signals in accordance with the TCI information, based at least in part on whether the TCI information relating to the common beam TCI indication is usable for the one or more channels or reference signals of the plurality of channels or reference signals, wherein the one or more channels or reference signals are a proper subset of the plurality of channels or reference signals. Numerous other aspects are described.

30 Claims, 12 Drawing Sheets

JOINT TRANSMISSION CONFIGURATION INDICATOR (TCI) INDICATION FOR SINGLE-CHANNEL TCI

FIELD OF THE DISCLOSURE

Aspects of the present disclosure generally relate to wireless communication and to techniques and apparatuses for joint transmission configuration indicator (TCI) indication for single-channel TCI.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes receiving TCI information relating to a common beam TCI indication, the TCI information relating to a plurality of channels or reference signals; and selectively transmitting or receiving one or more channels or reference signals of the plurality of channels or reference signals in accordance with the TCI information, based at least in part on whether the TCI information relating to the common beam TCI indication is usable for the one or more channels or reference signals of the plurality of channels or reference signals, wherein the one or more channels or reference signals are a proper subset of the plurality of channels or reference signals.

In some aspects, a method of wireless communication performed by a base station includes transmitting TCI information relating to a common beam TCI indication, the TCI information relating to a plurality of channels or reference signals; and selectively transmitting or receiving one or more channels or reference signals of the plurality of channels or reference signals in accordance with the TCI information, based at least in part on whether the TCI information relating to the common beam TCI indication is usable for the one or more channels or reference signals, wherein the one or more channels or reference signals are a proper subset of the plurality of channels or reference signals.

In some aspects, a UE for wireless communication includes a memory and one or more processors operatively coupled to the memory, the memory and the one or more processors configured to: receive TCI information relating to a common beam TCI indication, the TCI information relating to a plurality of channels or reference signals; and selectively transmit or receive one or more channels or reference signals of the plurality of channels or reference signals in accordance with the TCI information, based at least in part on whether the TCI information relating to the common beam TCI indication is usable for the one or more channels or reference signals of the plurality of channels or reference signals, wherein the one or more channels or reference signals are a proper subset of the plurality of channels or reference signals.

In some aspects, a base station for wireless communication includes a memory and one or more processors operatively coupled to the memory, the memory and the one or more processors configured to: transmit TCI information relating to a common beam TCI indication, the TCI information relating to a plurality of channels or reference signals; and selectively transmit or receive one or more channels or reference signals of the plurality of channels or reference signals in accordance with the TCI information, based at least in part on whether the TCI information relating to the common beam TCI indication is usable for the one or more channels or reference signals, wherein the one or more channels or reference signals are a proper subset of the plurality of channels or reference signals.

In some aspects, a non-transitory computer-readable medium storing a set of instructions for wireless communication includes one or more instructions that, when executed by one or more processors of a UE, cause the UE to: receive TCI information relating to a common beam TCI indication, the TCI information relating to a plurality of channels or reference signals; and selectively transmit or receive one or more channels or reference signals of the plurality of channels or reference signals in accordance with the TCI information, based at least in part on whether the TCI information relating to the common beam TCI indication is usable for the one or more channels or reference signals of the plurality of channels or reference signals, wherein the one or more channels or reference signals are a proper subset of the plurality of channels or reference signals.

In some aspects, a non-transitory computer-readable medium storing a set of instructions for wireless communication includes one or more instructions that, when executed by one or more processors of a base station, cause the base station to: transmit TCI information relating to a common beam TCI indication, the TCI information relating to a plurality of channels or reference signals; and selectively transmit or receive one or more channels or reference signals of the plurality of channels or reference signals in accordance with the TCI information, based at least in part on whether the TCI information relating to the common beam TCI indication is usable for the one or more channels or reference signals, wherein the one or more channels or reference signals are a proper subset of the plurality of channels or reference signals.

In some aspects, an apparatus for wireless communication includes means for receiving TCI information relating to a common beam TCI indication, the TCI information relating to a plurality of channels or reference signals; and means for selectively transmitting or receiving one or more channels or reference signals of the plurality of channels or reference signals in accordance with the TCI information, based at least in part on whether the TCI information relating to the common beam TCI indication is usable for the one or more channels or reference signals of the plurality of channels or reference signals, wherein the one or more channels or reference signals are a proper subset of the plurality of channels or reference signals.

In some aspects, an apparatus for wireless communication includes means for transmitting TCI information relating to a common beam TCI indication, the TCI information relating to a plurality of channels or reference signals; and means for selectively transmitting or receiving one or more channels or reference signals of the plurality of channels or reference signals in accordance with the TCI information, based at least in part on whether the TCI information relating to the common beam TCI indication is usable for the one or more channels or reference signals, wherein the one or more channels or reference signals are a proper subset of the plurality of channels or reference signals.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
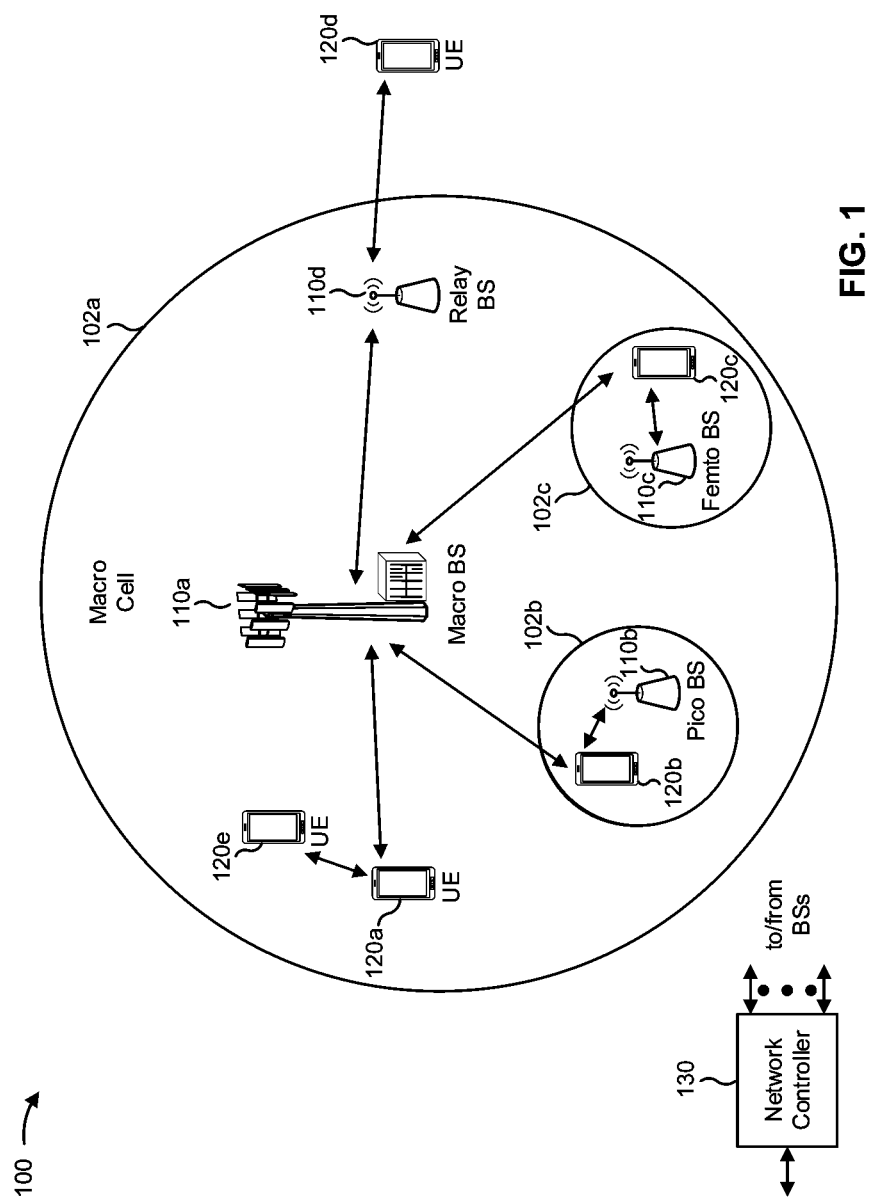
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d ) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c ) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e ) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
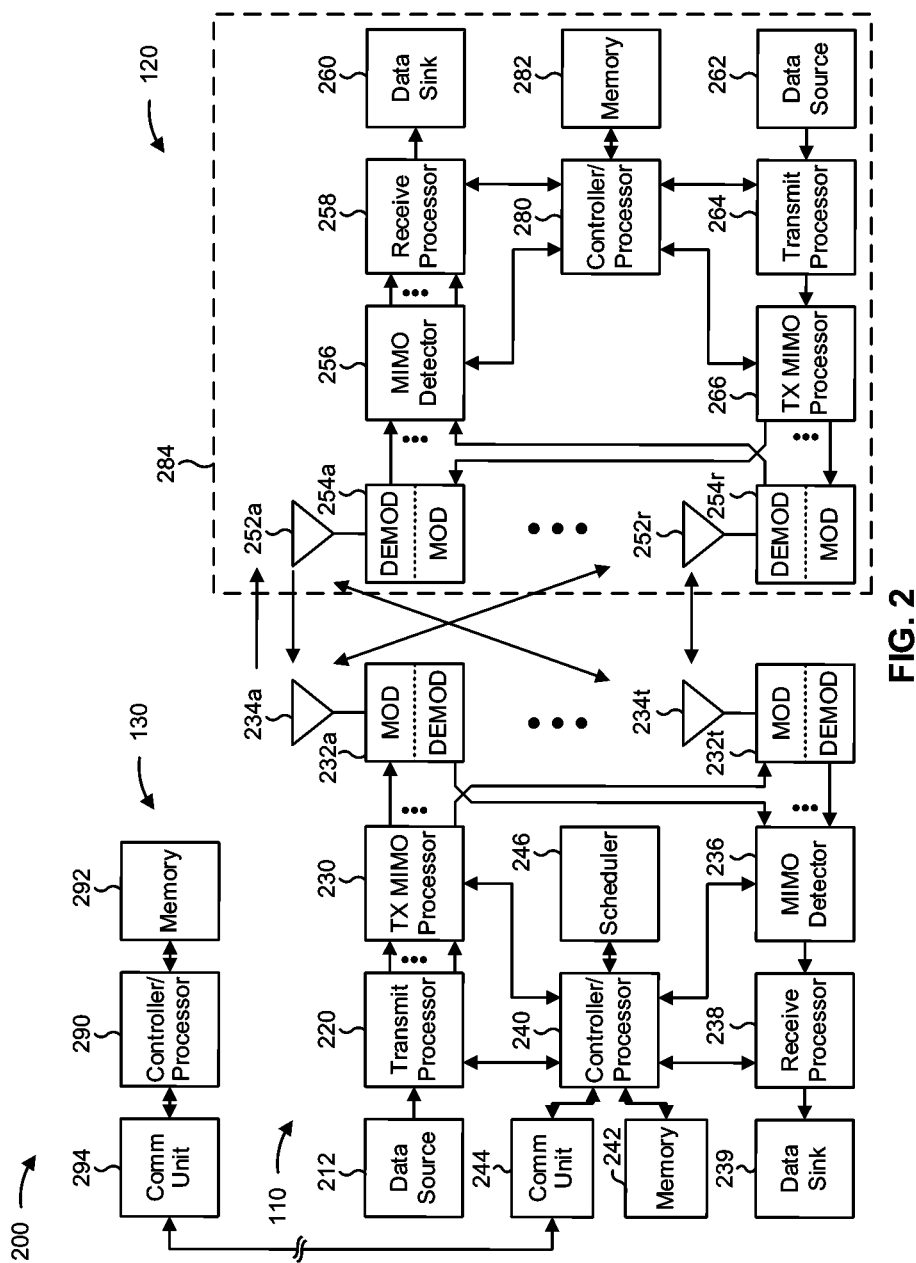
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, wherein general T ≥1 and R ≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r ) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-10.

Controller/processor 240 of base station 110, controller/processor 280 of UE 120, and/or any other component(s) of FIG. 2 may perform one or more techniques associated with joint transmission configuration indicator (TCI) indication for single-channel TCI, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
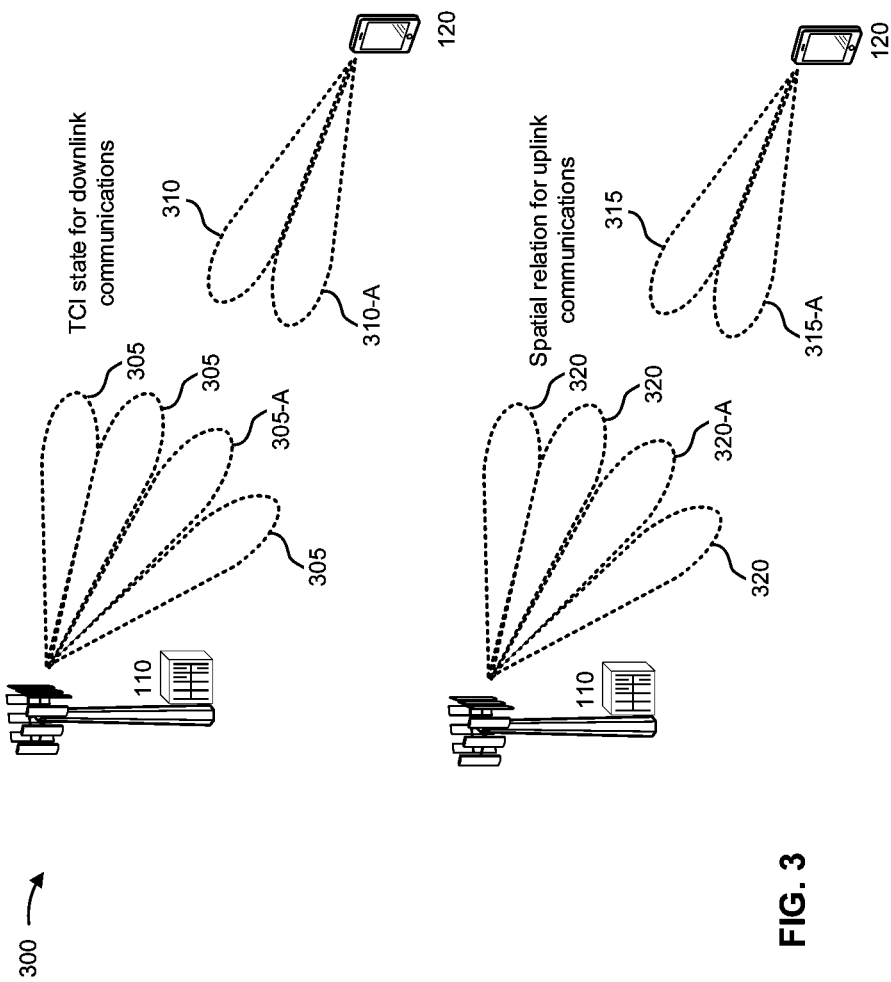
FIG. 3 is a diagram illustrating an example of using beams for communications between a base station and a UE, in accordance with various aspects of the present disclosure.

FIG. 3 is a diagram illustrating an example 300 of using beams for communications between a base station and a UE, in accordance with various aspects of the present disclosure. As shown in FIG. 3, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters at receive circuitry of the UE 120. The UE 120 may identify a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

A downlink beam, such as a BS transmit beam 305 or a UE receive beam 310, may be associated with a transmission configuration indicator (TCI) state. A TCI state may indicate a directionality or a characteristic of the downlink beam, such as one or more quasi-colocation (QCL) properties of the downlink beam. A QCL property may include, for example, a Doppler shift, a Doppler spread, an average delay, a delay spread, or spatial receive parameters, among other examples. In some examples, each BS transmit beam 305 may be associated with a synchronization signal block (SSB), and the UE 120 may indicate a preferred BS transmit beam 305 by transmitting uplink transmissions in resources of the SSB that are associated with the preferred BS transmit beam 305. A particular SSB may have an associated TCI state (for example, for an antenna port or for beamforming).

The base station 110 may, in some examples, indicate a downlink BS transmit beam 305 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a BS transmit beam 305 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, a beam direction, or beam symbols, among other examples. The UE 120 may transmit uplink communications via one or more UE transmit beams 315.

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

As indicated above, FIG. 3 is provided as an example. Other examples may differ from what is described with respect to FIG. 3.

A UE may communicate with a BS based at least in part on TCI, as described above. The term "TCI" at least includes a TCI state that indicates at least one source reference signal (RS) to provide a reference (e.g., a UE assumption) for determining a QCL parameter and/or a spatial filter, as described above. Certain aspects of TCI state communication, such as Layer 1 based beam indication, may support common beam TCI indication. "Common beam TCI indication" refers to TCI-related signaling that relates to multiple target signals. As one example, a common beam TCI indication may provide a TCI state that applies to one or more uplink signals and one or more downlink signals (e.g., a joint uplink/downlink common TCI state activation). As another example, a common beam TCI indication may provide a TCI state that applies to multiple downlink signals (e.g., a downlink-only common TCI state activation). As yet another example, a common beam TCI indication may provide a TCI state that applies to multiple uplink signals (e.g., an uplink-only common TCI state activation). Such a downlink signal may include, for example, a physical downlink control channel (PDCCH), a physical downlink shared channel (PDSCH), a channel state information reference signal (CSI-RS), or a positioning reference signal (PRS). Such an uplink signal may include, for example, a physical uplink control channel (PUCCH), a physical uplink shared channel (PUSCH), a physical random access channel (PRACH), or a sounding reference signal (SRS). The common beam TCI indication, including joint uplink/downlink common TCI state activation, downlink-only common TCI state activation, and uplink-only common TCI state activation, may be referred to as a unified TCI framework. In some aspects, the common beam TCI indication may be transmitted using at least UE-specific (e.g., unicast) downlink control information (DCI).

The unified TCI framework (e.g., common TCI state indication) may support various features for common TCI indication (e.g., TCI indications relating to multiple channels or reference signals). However, these various features may not be defined for single TCI indication, or for TCI indications relating to a subset of channels or reference signals selected from multiple channels or reference signals associated with a common TCI indication. One example of such a feature is whether the indication of a beam for plurality of channels or RSs using a common beam TCI state can indicate the single channel or RS or the subset of channels or RSs or not. Another example of such a feature is an indication of whether TCI pools (which identify potential TCI states that can be activated and/or selected for a beam) can be shared between common TCI types and single or subset TCI types (described in more detail elsewhere herein). A third example of such a feature is an indication of whether DCI or medium access control (MAC) based beam updating or activation can be applicable between common TCI indication and single/subset TCI indication. A fourth example of such a feature is an indication of whether a simultaneous TCI activation across multiple component carriers (CCs) is applicable to a TCI for a single channel or RS or a subset of channels or RSs. If such features are not well-defined for single channels or RSs, or for subsets of a plurality of channels or RSs, then ambiguity in network communications may occur, feature parity may be lost, and beamformed communication efficiency may be decreased.

Techniques and apparatuses described herein resolve ambiguity regarding whether the above-described features can be used for a single channel or RS and/or for a subset of channels or RSs of a plurality of channels or RSs associated with a common beam TCI indication. Each of the above-described features is described in turn below. By resolving such ambiguity, the efficiency of beamformed communications and the versatility of TCI indication is improved.

Figure 4:
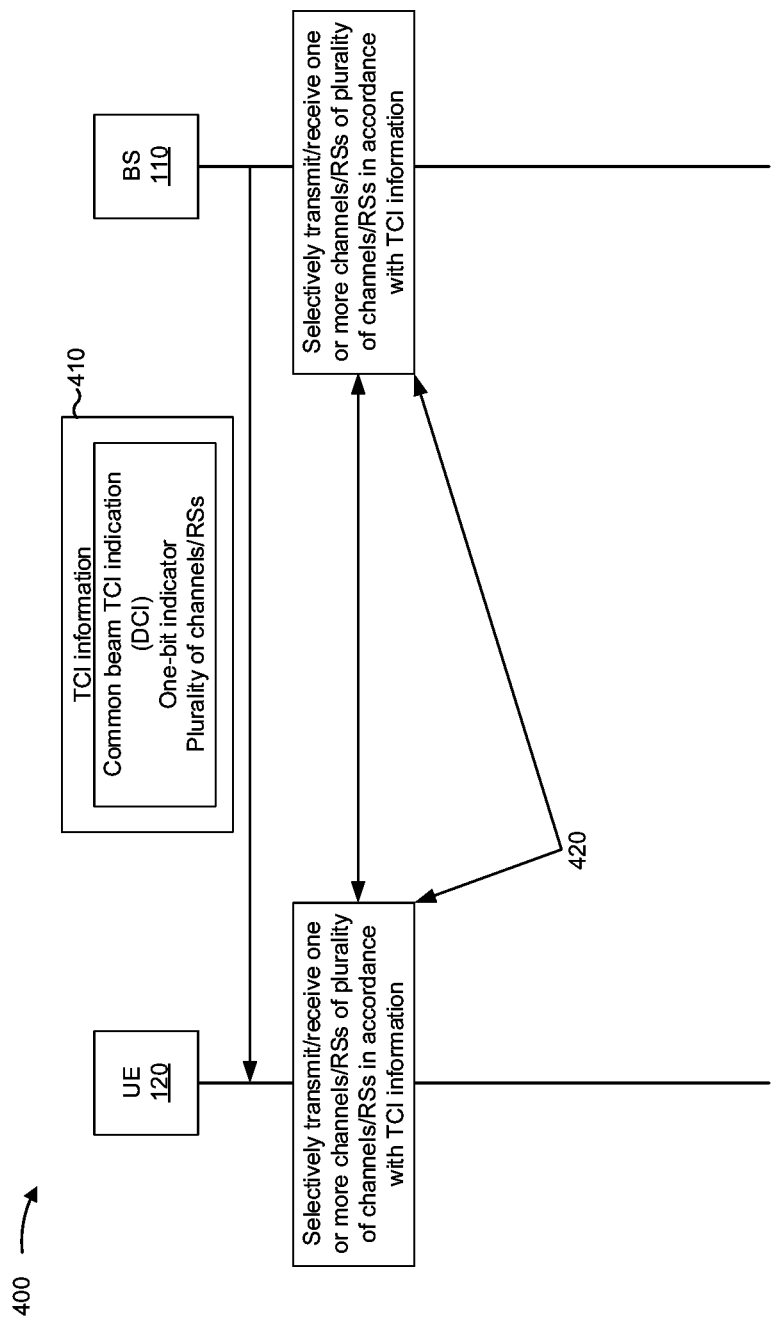
FIG. 4 is a diagram illustrating an example of indication of a TCI state for a single channel or RS (channel/RS) or a subset of channels or RSs (channels/RSs) based at least in part on a common beam TCI indication, in accordance with various aspects of the present disclosure.

FIG. 4 is a diagram illustrating an example 400 of indication of a TCI state for a single channel or RS (channel/RS) or a subset of channels or RSs (channels/RSs) based at least in part on a common beam TCI indication, in accordance with various aspects of the present disclosure. As shown, example 400 includes a BS 110 and a UE 120.

As shown in FIG. 4, and by reference number 410, the BS 110 may transmit TCI information to the UE 120. In example 400, "TCI information" refers to a transmission carrying a common beam TCI indication. In example 400, "common beam TCI indication" refers to DCI configured to indicate a TCI state for multiple channels/RSs. For example, the DCI may indicate a TCI for a joint uplink/downlink TCI type (e.g., applying to one or more uplink channels/RSs and one or more downlink channels/RSs), a downlink-only common TCI type (e.g., applying to a plurality of downlink channels/RSs), or an uplink-only common TCI type (e.g., applying to a plurality of uplink channels/RSs).

As further shown, the DCI may include a one-bit indicator (e.g., an indicator of 1 bit). The one-bit indicator may be configured to indicate whether the DCI, which indicates a TCI state for a plurality of channels/RSs, can be extended (e.g., interpreted) to indicate TCI states for one or more channels/RSs of the plurality of channels/RSs. For example, the one or more channels/RSs may be a proper subset of the plurality of channels/RSs. A first value of the one-bit indicator may indicate that the common beam TCI state (e.g., the TCI state for the plurality of channels/RSs) can be extended to TCIs for each single channel/RS of the plurality of channels/RSs). For example, the first value may indicate that a joint PDCCH, PDSCH, PUCCH, and PUSCH TCI state may be extended to TCI for one or more of a single CORESET, PUCCH, PDSCH, or PUSCH. A second value of the one-bit indicator may indicate that the common beam TCI state cannot be extended (e.g., interpreted) to indicate TCI states for the one or more channels/RSs of the plurality of channels/RSs. In such a case, the UE 120 may interpret the DCI to apply only for the plurality of channels/RSs, and not for a proper subset of the plurality of channels/RSs.

As shown by reference number 420, the UE 120 and the BS 110 may selectively transmit or receive one or more channels or reference signals of the plurality of channels or reference signals in accordance with the TCI information. For example, the UE 120 may selectively transmit or receive the plurality of channels/RSs using the indicated TCI state for the plurality of channels/RSs if the one-bit indicator has the second value. As another example, the UE 120 may transmit or receive one or more channels/RSs of the plurality of channels/RSs using the TCI state if the one-bit indicator has the first value. Thus, the UE 120 selectively uses a common beam TCI indication (e.g., the DCI indicating the TCI states for the plurality of channels/RSs) for the one or more channels or reference signals of the plurality of channels or reference signals, or for the entire plurality of channels or reference signals, based at least in part on the one-bit indication in the DCI. Indicating whether the common beam TCI indicator can be extended to the one or more channels/RSs in the common beam TCI indicator may provide increased flexibility over a standardized or configured approach for such an indication.

As indicated above, FIG. 4 is provided as an example. Other examples may differ from what is described with regard to FIG. 4.

Figure 5:
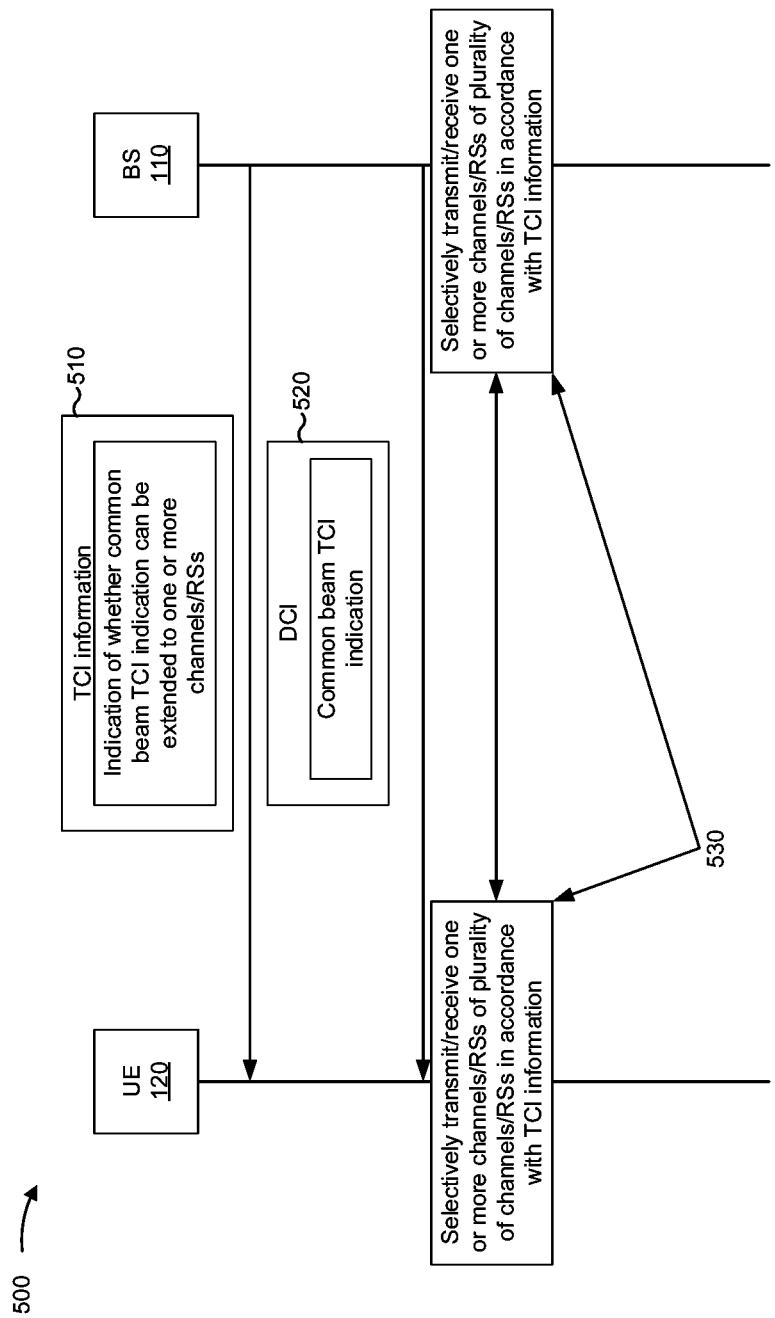
FIG. 5 is a diagram illustrating an example of indication of a TCI state for a single channel/RS or a subset of channels/RSs based at least in part on a common beam TCI indication, in accordance with various aspects of the present disclosure.

FIG. 5 is a diagram illustrating an example 500 of indication of a TCI state for a single channel/RS or a subset of channels/RSs based at least in part on a common beam TCI indication, in accordance with various aspects of the present disclosure. As shown, example 500 includes a BS 110 and a UE 120.

As shown in FIG. 5, and by reference number 510, the BS 110 may transmit TCI information to the UE 120. In example 500, "TCI information" refers to information indicating whether a common beam TCI indication can be extended (e.g., interpreted) to apply to one or more channels/RSs of a plurality of channels/RSs to which the common beam TCI indication relates. For example, the TCI information may include configuration information (e.g., radio resource control signaling or the like), MAC signaling, or the like.

In some aspects, the TCI information may indicate whether a common beam TCI indication can be extended (e.g., interpreted) to apply to one or more channels/RSs of a plurality of channels/RSs to which the common beam TCI indication relates. For example, the TCI information may define whether or not one or more TCI types of common TCIs (e.g., of the uplink/downlink TCI type, the downlink-only common TCI type, and the uplink-only common TCI type) can indicate a beam for each single channel/RS associated with a plurality of channels/RSs indicated by the one or more types of common TCIs. In some aspects, the indication of whether a common beam TCI indication can be extended (e.g., interpreted) to apply to one or more channels/RSs of a plurality of channels/RSs to which the common beam TCI indication relates may be specified in a wireless communication standard, may be preconfigured for the UE 120, or the like.

As shown by reference number 520, the BS 110 may transmit a common beam TCI indication to the UE 120. In example 500, "common beam TCI indication" refers to DCI configured to indicate a TCI state for multiple channels/RSs. For example, the DCI may indicate a TCI for a joint uplink/downlink TCI type (e.g., applying to one or more uplink channels/RSs and one or more downlink channels/RSs), a downlink-only common TCI type (e.g., applying to a plurality of downlink channels/RSs), or an uplink-only common TCI type (e.g., applying to a plurality of uplink channels/RSs).

As shown by reference number 530, the UE 120 may determine whether the DCI, which indicates a TCI state for a plurality of channels/RSs, can be extended (e.g., interpreted) to indicate TCI states for one or more channels/RSs of the plurality of channels/RSs. For example, the one or more channels/RSs may be a proper subset of the plurality of channels/RSs. The UE 120 may perform this determination based at least in part on the indication received in the TCI information, a specified rule in a wireless communication standard, a preconfiguration of the UE 120, or the like.

As shown by reference number 530, the UE 120 may selectively transmit or receive one or more channels or reference signals of the plurality of channels or reference signals in accordance with the TCI information. For example, the UE 120 may selectively transmit or receive the plurality of channels/RSs using the indicated TCI state for the plurality of channels/RSs if the BS 110, the wireless communication standard, or the preconfiguration indicates that the indicated TCI state cannot be extended to the one or more channels/RSs. As another example, the UE 120 may transmit or receive one or more channels/RSs of the plurality of channels/RSs using the TCI state if the BS 110, the wireless communication standard, or the preconfiguration indicates that the indicated TCI state can be extended to the one or more channels/RSs. Thus, the UE 120 selectively uses a common beam TCI indication (e.g., the DCI indicating the TCI states for the plurality of channels/RSs) for the one or more channels or reference signals of the plurality of channels or reference signals, or for the entire plurality of channels or reference signals, based at least in part on the preconfiguration, the wireless communication standard, or the configuration information from the BS 110, which may conserve physical-layer signaling resources relative to DCI-based indication.

As indicated above, FIG. 5 is provided as an example. Other examples may differ from what is described with regard to FIG. 5.

Figure 6:
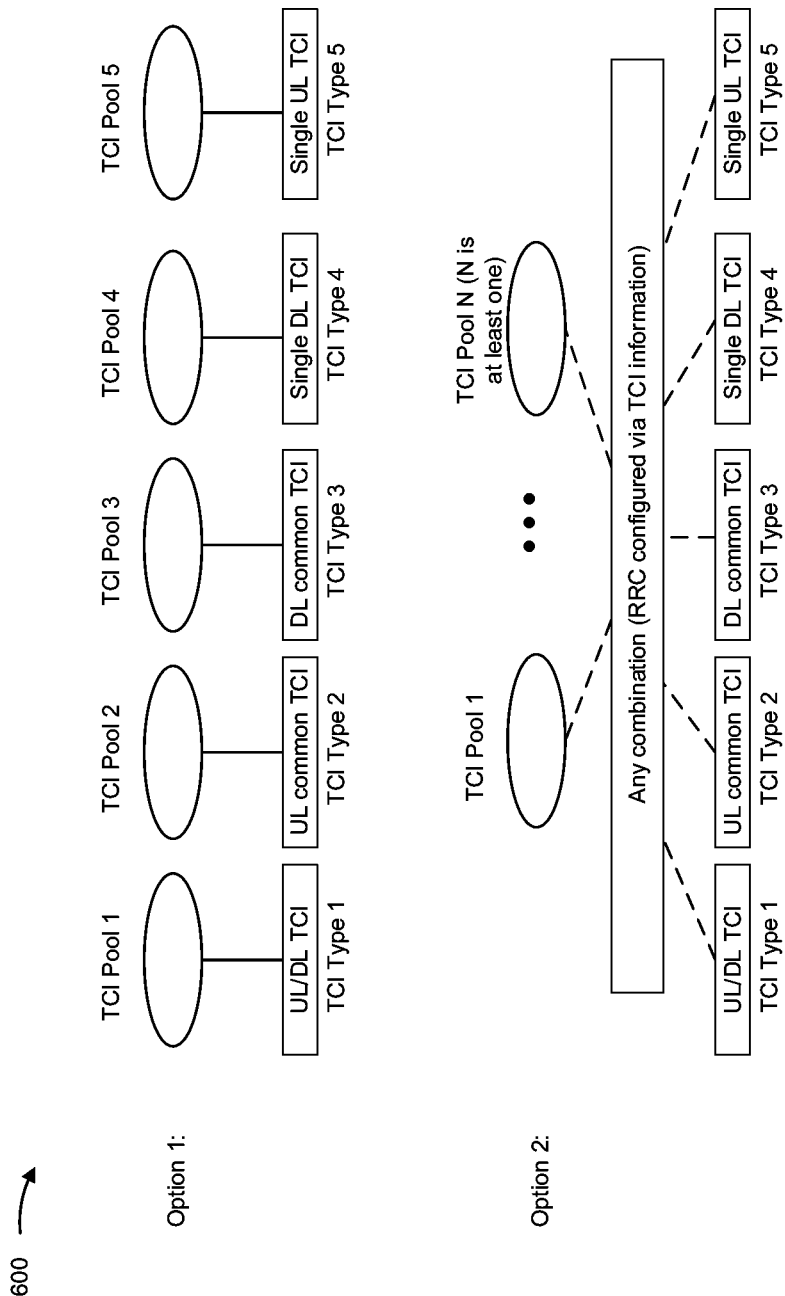
FIG. 6 is a diagram illustrating an example of TCI pool sharing for different TCI types, in accordance with various aspects of the present disclosure.

FIG. 6 is a diagram illustrating an example 600 of TCI pool sharing for different TCI types, in accordance with various aspects of the present disclosure. FIG. 6 illustrates a plurality of TCI pools (shown as ovals). FIG. 6 concerns five TCI types: TCI Type 1 (corresponding to an uplink/downlink common beam TCI indication), TCI Type 2 (corresponding to an uplink-only common TCI indication), TCI Type 3 (corresponding to a downlink-only common TCI indication), TCI Type 4 (corresponding to a single downlink TCI indication or a single downlink spatial relation), and TCI Type 5 (corresponding to a single uplink TCI indication or a single uplink spatial relation). FIG. 6 shows options for whether a TCI type for a single channel/RS or a subset of channels/RSs (such as TCI Types 4 and 5) can share a TCI pool with a TCI type for a common beam TCI indication (such as TCI Types 1, 2, and 3). Generally, the TCI types shown in FIG. 6 can be grouped into a first TCI type concerning a plurality of channels/RSs (e.g., TCI Types 1, 2, and 3) and a second TCI type concerning a single channel/RS or a proper subset of a plurality of channels/RSs (e.g., TCI Types 4 and 5).

A TCI pool may be configured for a UE 120 via RRC signaling. A TCI pool may identify a set of TCI states from which a TCI state can be selected for activation (e.g., to make the TCI state available for uplink/downlink beam selection for a UE 120) and/or usage (e.g., to associate the TCI state with a channel/RS or a plurality of channels/RSs in order to identify a beam or other QCL information for the associated channel(s)/RS(s)). If a TCI pool is associated with a TCI type, then the TCI pool includes a set of TCI states that can be selected or used for a TCI indication of the TCI type. For example, if a TCI pool is associated with TCI Type 1, then the TCI pool includes a set of TCI states from which a BS 110 can select a TCI state to be activated and/or used for one or more uplink and one or more downlink channels/RSs using a common beam TCI indication.

Example 600 shows two options for association between TCI pools and TCI types: Option 1 and Option 2. Each option is described in turn below.

In Option 1, each TCI type (of the five TCI Types shown in FIG. 6) may have a respective TCI pool. For example, each TCI type may be configured with a separate TCI pool. As another example, TCI pools and TCI types may be associated via a one-to-one relationship. In this case, TCI information transmitted from a BS 110 to a UE 120 may include RRC information indicating a set of TCI pools associated with a set of corresponding TCI types. Option 1 may simplify implementation of multiple TCI pools relative to more flexible configuration options.

In Option 2, any combination of the five TCI types can share a TCI pool. For example, each combination of TCI types can include at least two TCI types from the five TCI types shown in FIG. 6. In some aspects, a set of TCI pools and a set of TCI types using Option 2 can have a one-to-one relationship, a many-to-one relationship, a one-to-many relationship, or a many-to-many relationship. An RRC configuration for a TCI pool may be carried in TCI information, and may indicate one or more TCI types associated with the TCI pool. For example, a plurality of TCI types can be configured to be associated with a single TCI pool, where the plurality of TCI types can include at least one first TCI type (e.g., selected from TCI Types 1, 2, and 3) and at least one second TCI type (e.g., selected from TCI Types 4 and 5), multiple first TCI types, multiple second TCI types, or multiple first TCI types and multiple second TCI types.

As a first example of Option 2, a joint downlink and uplink common beam TCI type (e.g., TCI Type 1) may share the same TCI pool with the TCI for a single or subset downlink (e.g., TCI Type 4) and/or uplink (e.g., TCI Type 5) channel/RS. As a second example of Option 2, a joint downlink and uplink common beam TCI type (e.g., TCI Type 1) may share the same TCI pool with the downlink only unified TCI (e.g., TCI Type 2) and/or the uplink only common beam (e.g., TCI Type 3) TCI pool. As a third example, a joint DL and UL, DL only common beam TCI, and UL only common beam TCI may share the same TCI pool, and there may be separate TCI pools for the TCI for single or subset DL and/or UL channels/RSs. Option 2 may provide increased flexibility relative to a one-to-one approach for TCI state mapping to TCI pools.

In example 600, DCI or MAC signaling may indicate one or more TCI states to activate from a configured TCI pool for a given TCI type. In some aspects, DCI or MAC signaling may select a TCI state, from the one or more activated TCI states, for usage in association with a plurality of channels/RSs (if the DCI or MAC signaling is a common beam TCI indication). In some aspects, DCI or MAC signaling may select a TCI state, from the one or more activated TCI states, for usage in association with a single channel/RS or a proper subset of channels/RSs of a plurality of channels/RSs indicated by the DCI or MAC (e.g., if the DCI or MAC signaling is a common beam TCI indication that can be extended to the single channel/RSs or the proper subset of channels/RSs). In some aspects, DCI or MAC signaling may select a TCI state, from the one or more activated TCI states, for usage in association with a single channel/RS indicated by the DCI or MAC (e.g., if the DCI or MAC signaling is a single beam TCI indication).

As indicated above, FIG. 6 is provided as one or more examples. Other examples may differ from what is described with regard to FIG. 6.

Figure 7:
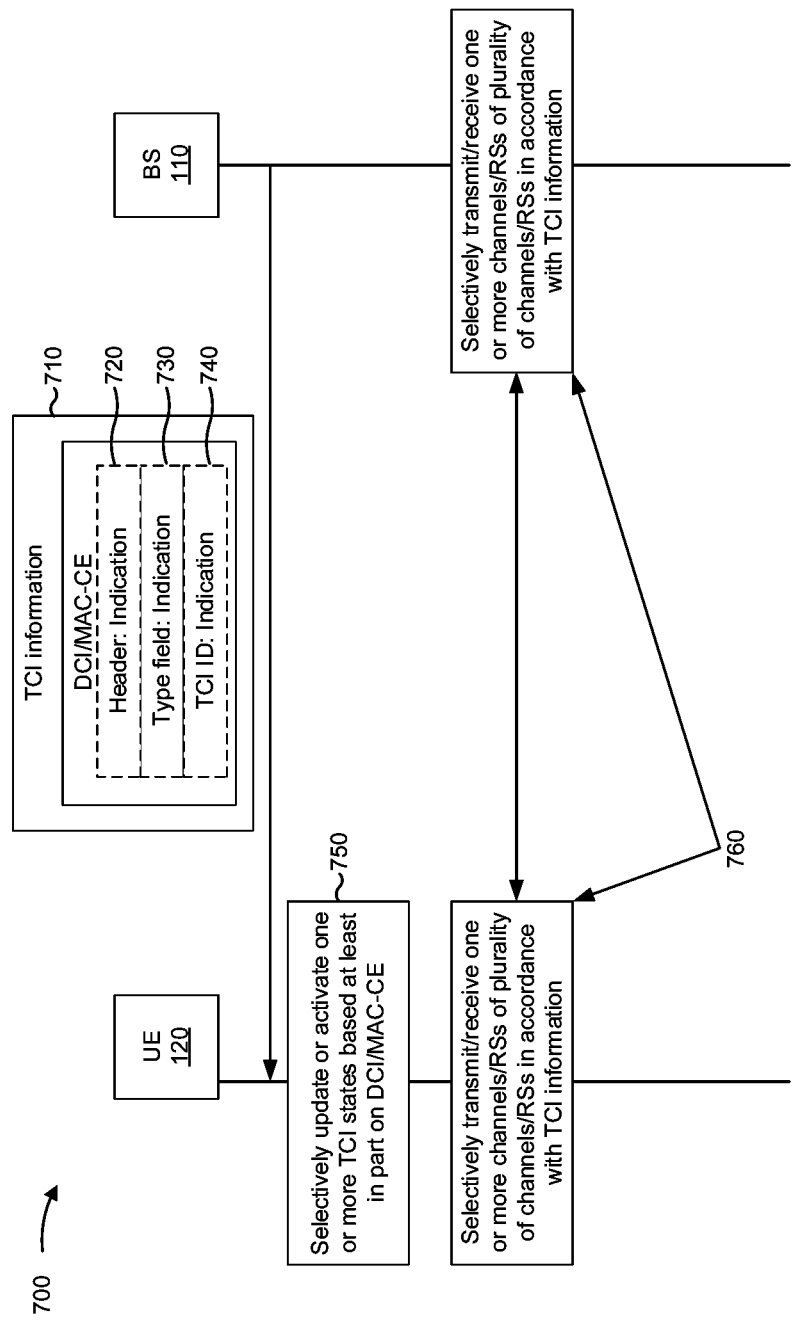
FIG. 7 is a diagram illustrating an example of DCI or MAC based beam activation or updating for one or more channels or RSs, in accordance with various aspects of the present disclosure.

FIG. 7 is a diagram illustrating an example 700 of DCI or MAC based beam activation or updating for one or more channels or RSs, in accordance with various aspects of the present disclosure. As shown, example 700 includes a BS 110 and a UE 120. "DCI or MAC based beam activation or updating" can refer to using DCI signaling or MAC signaling to: activate a configured TCI state, update an activated TCI state from a first configured TCI state to a second configured TCI state, or select an activated TCI state for a beam associated with one or more channels/RSs.

As shown in FIG. 7, and by reference number 710, the BS 110 may transmit TCI information to the UE 120. In example 700, "TCI information" refers to a transmission carrying DCI or a MAC control element (MAC-CE) for DCI or MAC based beam activation or updating, where DCI or MAC based beam activation or updating is referred to herein as activating a TCI configuration. If the DCI or the MAC-CE indicates a TCI state associated with a plurality of channels/RSs, then the DCI or the MAC-CE may be considered a common beam TCI indication. In some aspects, the DCI or the MAC-CE may indicate a TCI state associated with a single channel/RS. In some aspects, the DCI or the MAC-CE may indicate a TCI state associated with a plurality of channels/RSs (e.g., a common beam TCI indication) which can be extended to one or more of the plurality of channels/RSs.

As shown by the dashed boxes, in some aspects, the TCI information may include an indication of whether the TCI information is usable only for a plurality of channels/RSs, or is usable for one or more channels/RSs of the plurality of channels/RSs. As shown by reference number 720, in some aspects, the indication may include a MAC-CE header of the TCI information (e.g., if the TCI information carries the MAC-CE). For example, the MAC-CE header may indicate whether the TCI information is usable for less than all of the plurality of channels or reference signals, or is usable only for the plurality of channels or reference signals, based at least in part on whether the MAC-CE header is associated with the one or more channels or reference signals or the plurality of channels or reference signals. In this case, different MAC-CE headers may be associated with common TCI types (e.g., corresponding to TCI Types 1, 2, and 3 of FIG. 6) and single-channel TCI types (e.g., corresponding to TCI Types 4 and 5 of FIG. 6). Based at least in part on a received MAC-CE header identifier, the UE 120 may determine whether the DCI or the MAC-CE updates or activates a common TCI state or a single-channel TCI state.

As shown by reference number 730, in some aspects, the indication may include a type field of the DCI or the MAC-CE. For example, the type field may indicate whether the TCI information is usable for the one or more channels or reference signals, or is usable only for the plurality of channels or reference signals.

As shown by reference number 740, in some aspects, an identifier of a TCI state (e.g., a TCI ID) may indicate whether the DCI or MAC-CE is usable only for a plurality of channels/RSs, or is usable for one or more of the plurality of channels/RSs. For example, the UE 120 may determine whether the TCI information relating to the common beam TCI indication is usable for less than all of the plurality of channels or reference signals based at least in part on a set of identifiers of TCI states indicated by the TCI information, wherein the plurality of channels or reference signals is associated with a first range of identifiers and the one or more channels or reference signals are associated with a second range of identifiers. In some aspects, the BS 110 may transmit, to the UE 120, information indicating the first range of identifiers and/or the second range of identifiers (e.g., via TCI information, such as RRC signaling prior to the message shown by reference number 710, or the like). In some aspects, the UE 120 may be preconfigured with information indicating the first range and/or the second range. In some aspects, the first range and/or the second range may be specified, such as in a wireless communication standard.

As shown by reference number 750, the UE 120 may selectively update or activate one or more TCI states of the plurality of channels or reference signals, or the one or more channels or reference signals, based at least in part on the DCI or the MAC-CE. For example, the UE 120 may update or activate one or more TCI states for the plurality of channels/RSs based at least in part on a determination that the DCI or the MAC-CE is usable for only the plurality of channels/RSs (e.g., based at least in part on a range of identifiers of TCI states indicated by the DCI or the MAC-CE, a MAC-CE header of the DCI or the MAC-CE, or a type field in the DCI or the MAC-CE, or the like). As another example, the UE 120 may update or activate one or more TCI states for the one or more channels/RSs based at least in part on a determination that the DCI or the MAC-CE is usable for the one or more channels/RSs (e.g., based at least in part on a range of identifiers of TCI states indicated by the DCI or the MAC-CE, a MAC-CE header of the DCI or the MAC-CE, a type field in the DCI or the MAC-CE, or the like). As shown by reference number 760, the UE 120 may selectively transmit or receive one or more channels or reference signals of the plurality of channels or reference signals in accordance with the TCI information. For example, the UE 120 may use an updated or activated TCI state for the one or more channels or reference signals, or for the plurality of channels or reference signals, based at least in part on the determination described in connection with reference number 750, above.

As indicated above, FIG. 7 is provided as an example. Other examples may differ from what is described with regard to FIG. 7.

Figure 8:
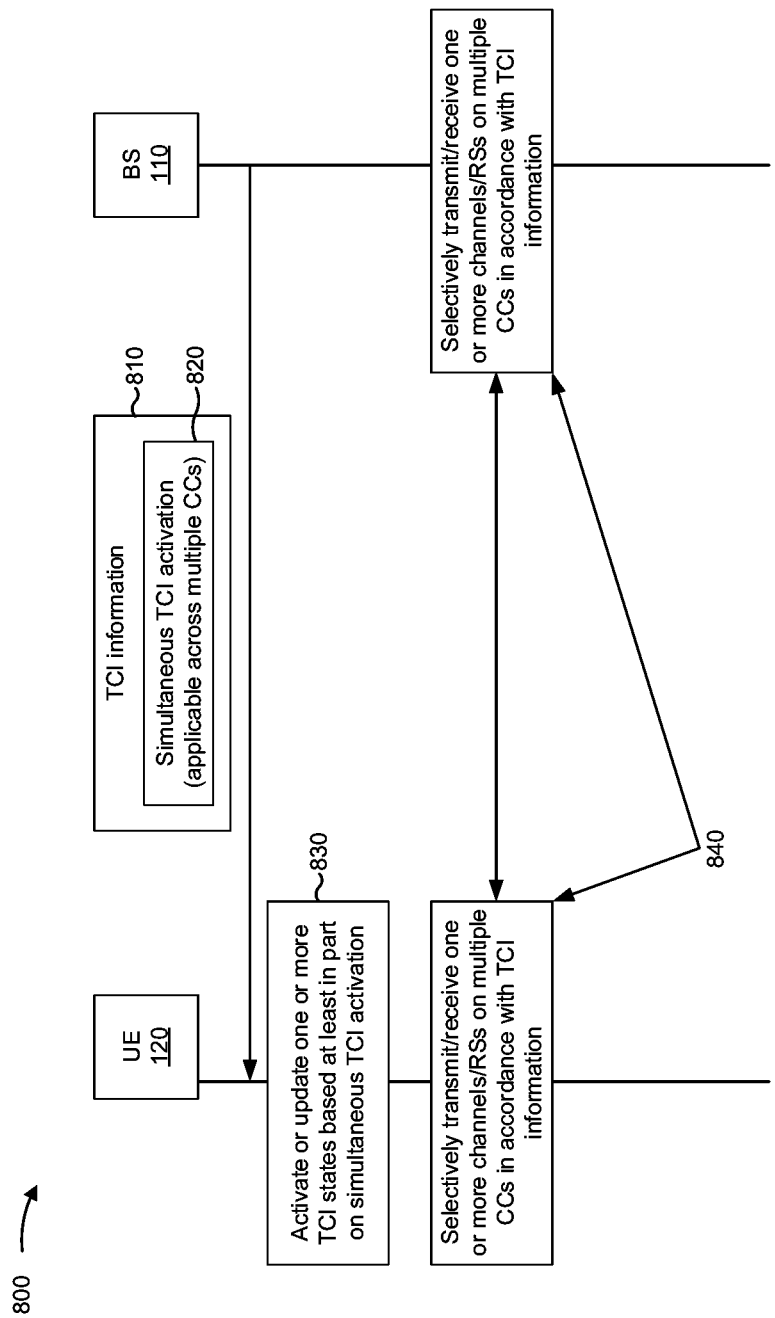
FIG. 8 is a diagram illustrating an example of simultaneous TCI activation across multiple component carriers (CCs) for TCI signaling associated with one or more channels/RSs, in accordance with various aspects of the present disclosure.

FIG. 8 is a diagram illustrating an example 800 of simultaneous TCI activation across multiple component carriers (CCs) for TCI signaling associated with one or more channels/RSs, in accordance with various aspects of the present disclosure. As shown, example 800 includes a UE 120 and a BS 110.

As shown by reference number 810, the BS 110 may transmit TCI information to the UE 120. As shown by reference number 820, the TCI information may include a simultaneous TCI activation that is applicable across multiple CCs. A CC is a carrier associated with a carrier aggregation (CA) configuration of the UE 120. A simultaneous TCI activation may activate a configured TCI state, or may select an activated TCI for a communication. A simultaneous TCI activation can be used for uplink communications or downlink communications. A simultaneous TCI activation can be conveyed using a MAC-CE, DCI, or the like. In some aspects, the simultaneous TCI activation may be provided via a common beam TCI indication (such as described above in connection with FIGS. 4 and 5, for example, via a common beam TCI indication that can be extended to one or more channels/RSs of a plurality of channels/RSs). In some aspects, the simultaneous TCI activation may be provided via a TCI indication for a single channel/RS.

As shown by reference number 830, the UE 120 may activate or update one or more TCI states across the multiple CCs for one or more channels/RSs in accordance with the TCI information. For example, the UE 120 may activate or update one or more TCI states indicated by the TCI information based at least in part on the simultaneous TCI activation being usable for the one or more channels/RSs. In some aspects, the TCI information may indicate a single TCI state identifier (e.g., an identifier of a TCI state), and the single TCI state identifier may be used to provide a quasi-colocation indication and to determine an uplink transmit spatial filter across the multiple CCs. For example, the TCI state identifier may imply that the same or a single channel or RS may be determined according to the TCI state(s) indicated by a single TCI state identifier (e.g. PDSCH only, single CORESET), which may be used to provide a QCL Type-D indication and to determine an uplink transmit spatial filter across the multiple CCs (e.g., which may be part of a set of configured CCs, such as a CC list). This may be applicable to intra-band CA. For example, the DCI may update/activate the TCI for a single channel/RS or a subset of channel/RSs on CC 1, and then the update/activation will apply to all CCs on the same CC list with CC1. As shown by reference number 840, the UE 120 and the BS 110 may selectively transmit or receive one or more channels/RSs on the multiple CCs in accordance with the TCI information.

In some aspects, the simultaneous TCI activation for the multiple CCs may not be applicable for the one or more channels/RSs. In such a case, the UE 120 may apply the simultaneous TCI activation only for a plurality of channels/RSs identified by the TCI information.

As indicated above, FIG. 8 is provided as an example. Other examples may differ from what is described with regard to FIG. 8.

Figure 9:
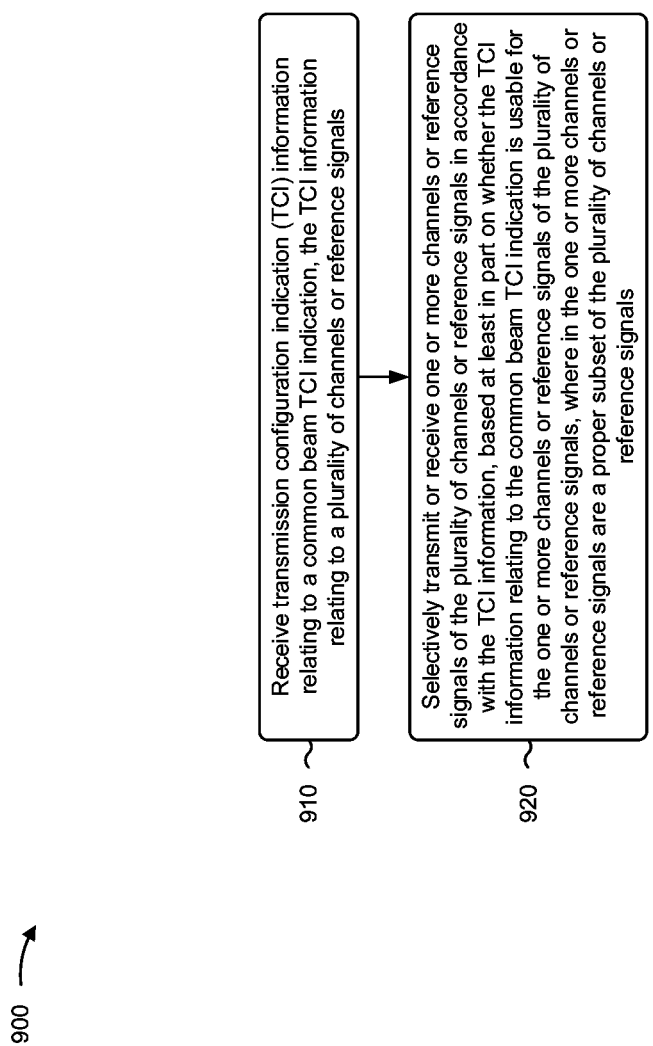
FIG. 9 is a diagram illustrating an example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120) performs operations associated with joint TCI indication for a single-channel TCI.

As shown in FIG. 9, in some aspects, process 900 may include receiving TCI information relating to a common beam TCI indication, the TCI information relating to a plurality of channels or reference signals (block 910). For example, the UE (e.g., using reception component 1102, depicted in FIG. 11) may receive TCI information relating to a common beam TCI indication, the TCI information relating to a plurality of channels or reference signals, as described above.

As further shown in FIG. 9, in some aspects, process 900 may include selectively transmitting or receiving one or more channels or reference signals of the plurality of channels or reference signals in accordance with the TCI information, based at least in part on whether the TCI information relating to the common beam TCI indication is usable for the one or more channels or reference signals of the plurality of channels or reference signals, wherein the one or more channels or reference signals are a proper subset of the plurality of channels or reference signals (block 920). For example, the UE (e.g., using transmission component 1104, depicted in FIG. 11) may selectively transmit or receive one or more channels or reference signals of the plurality of channels or reference signals in accordance with the TCI information, based at least in part on whether the TCI information relating to the common beam TCI indication is usable for the one or more channels or reference signals of the plurality of channels or reference signals, wherein the one or more channels or reference signals are a proper subset of the plurality of channels or reference signals, as described above.

Process 900 may include additional aspects, such as any single aspect or any combination of aspects described below and/or in connection with one or more other processes described elsewhere herein.

In a first aspect, the common beam TCI indication is a beam indication for the plurality of channels or reference signals.

In a second aspect, alone or in combination with the first aspect, the TCI information carries downlink control information including the common beam TCI indication, and selectively transmitting or receiving the one or more channels or reference signals further comprises transmitting or receiving the one or more channels or reference signals using a TCI state indicated by the common beam TCI indication based at least in part on a one-bit indication, carried in the downlink control information, indicating that the common beam TCI indication is usable for the one or more channels or reference signals.

In a third aspect, alone or in combination with one or more of the first and second aspects, the TCI information carries downlink control information including the common beam TCI indication, and process 900 includes transmitting or receiving the plurality of channels or reference signals using a TCI state indicated by the common beam TCI indication based at least in part on a one-bit indication, carried in the downlink control information, indicating that the common beam TCI indication is not usable for the one or more channels or reference signals.

In a fourth aspect, alone or in combination with one or more of the first through third aspects, selectively transmitting or receiving the one or more channels or reference signals further comprises selectively transmitting or receiving the one or more channels or reference signals using a TCI state indicated by the common beam TCI indication based at least in part on a preconfiguration or a configured rule indicating whether the common beam TCI indication is usable for the one or more channels or reference signals.

In a fifth aspect, alone or in combination with one or more of the first through fourth aspects, the TCI information includes radio resource control information identifying one or more TCI pools from which a selected TCI state can be indicated for an uplink or downlink communication, wherein the plurality of channels or reference signals are associated with a first TCI type and the one or more channels or reference signals are associated with a second TCI type different than the first TCI type.

In a sixth aspect, alone or in combination with one or more of the first through fifth aspects, a same TCI pool, of the one or more TCI pools, is usable for a plurality of TCI types including the first TCI type and the second TCI type.

In a seventh aspect, alone or in combination with one or more of the first through sixth aspects, the first TCI type and the second TCI type are included in a plurality of TCI types, and each TCI type, of the plurality of TCI types, is associated with a different TCI pool of the one or more TCI pools.

In an eighth aspect, alone or in combination with one or more of the first through seventh aspects, the TCI information includes information indicating one or more TCI types for which each TCI pool, of the one or more TCI pools, is usable.

In a ninth aspect, alone or in combination with one or more of the first through eighth aspects, the first TCI type is at least one of a joint uplink/downlink TCI type, a downlink-only common TCI type, or an uplink-only common TCI type, and the second TCI type is at least one of a downlink single TCI type, or an uplink single TCI type.

In a tenth aspect, alone or in combination with one or more of the first through ninth aspects, the TCI information includes a DCI or MAC based update or activation of a TCI configuration for the one or more channels or reference signals.

In an eleventh aspect, alone or in combination with one or more of the first through tenth aspects, the TCI information includes an indication of whether the TCI information is usable for the one or more channels or reference signals, or is usable only for the plurality of channels or reference signals.

In a twelfth aspect, alone or in combination with one or more of the first through eleventh aspects, the indication comprises one of a type field of DCI or a MAC control element of the TCI information, wherein the type field indicates whether the TCI information is usable for the one or more channels or reference signals, or is usable only for the plurality of channels or reference signals, or a MAC control element header of the TCI information, wherein the MAC control element header indicates whether the TCI information is usable for less than all of the plurality of channels or reference signals, or is usable only for the plurality of channels or reference signals, based at least in part on whether the MAC control element header is associated with the one or more channels or reference signals or the plurality of channels or reference signals.

In a thirteenth aspect, alone or in combination with one or more of the first through twelfth aspects, process 900 includes determining whether the TCI information relating to the common beam TCI indication is usable for less than all of the plurality of channels or reference signals based at least in part on a set of identifiers of TCI states indicated by the TCI information, wherein the plurality of channels or reference signals is associated with a first range of identifiers and the one or more channels or reference signals is associated with a second range of identifiers, and selectively updating or activating one or more TCI states of the plurality of channels or reference signals, or the one or more channels or reference signals, based at least in part on whether the set of identifiers are in the first range of identifiers or the second range of identifiers.

In a fourteenth aspect, alone or in combination with one or more of the first through thirteenth aspects, the TCI information includes a simultaneous TCI activation applicable across multiple component carriers (CCs), and process 900 includes activating or updating one or more TCI states across the multiple CCs for the one or more channels or reference signals in accordance with the TCI information based at least in part on the simultaneous TCI activation being usable for the one or more channels or reference signals.

In a fifteenth aspect, alone or in combination with one or more of the first through fourteenth aspects, the TCI information indicates a single TCI state identifier, and the single TCI state identifier is used to provide a quasi-colocation indication and to determine an uplink transmit spatial filter across the multiple CCs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
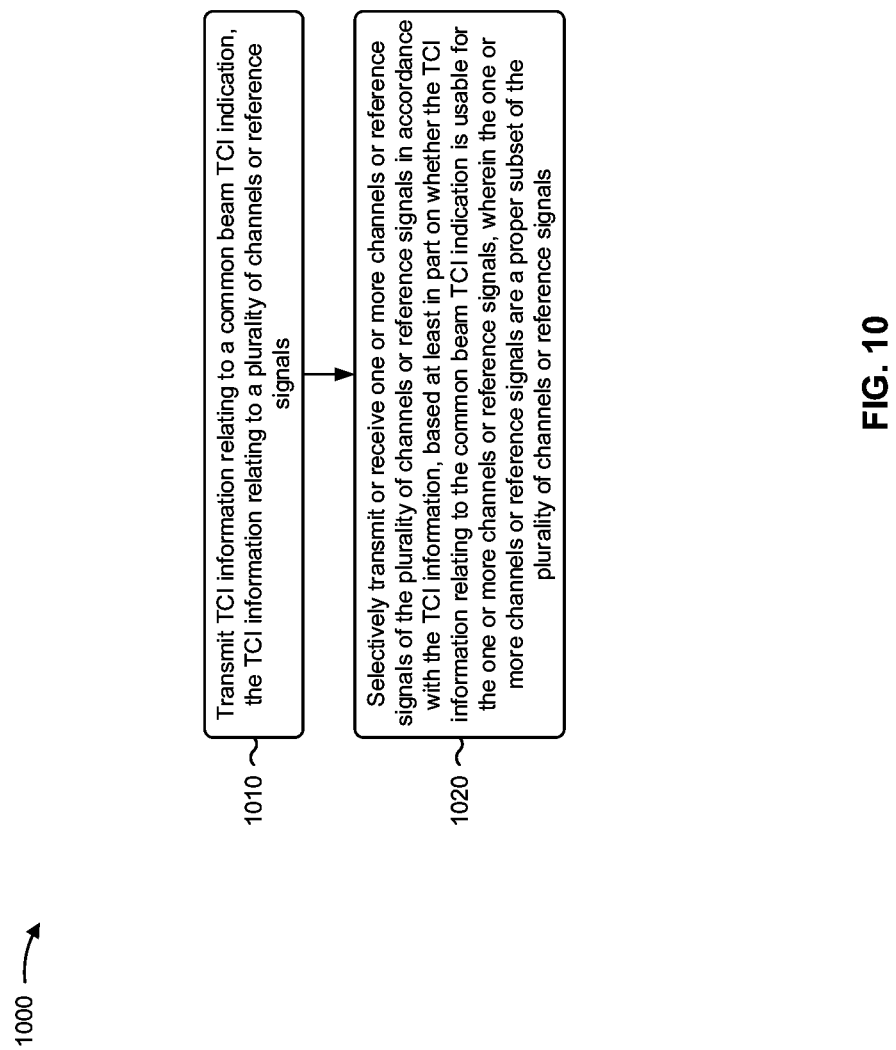
FIG. 10 is a diagram illustrating an example process performed, for example, by a base station, in accordance with various aspects of the present disclosure.

FIG. 10 is a diagram illustrating an example process 1000 performed, for example, by a base station, in accordance with various aspects of the present disclosure. Example process 1000 is an example where the base station (e.g., base station 110) performs operations associated with joint TCI indication for single-channel TCI.

As shown in FIG. 10, in some aspects, process 1000 may include transmitting TCI information relating to a common beam TCI indication, the TCI information relating to a plurality of channels or reference signals (block 1010). For example, the base station (e.g., using transmission component 1204, depicted in FIG. 12) may transmit TCI information relating to a common beam TCI indication, the TCI information relating to a plurality of channels or reference signals, as described above.

As further shown in FIG. 10, in some aspects, process 1000 may include selectively transmitting or receiving one or more channels or reference signals of the plurality of channels or reference signals in accordance with the TCI information, based at least in part on whether the TCI information relating to the common beam TCI indication is usable for the one or more channels or reference signals, wherein the one or more channels or reference signals are a proper subset of the plurality of channels or reference signals (block 1020). For example, the base station (e.g., using transmission component 1204, depicted in FIG. 12) may selectively transmit or receive one or more channels or reference signals of the plurality of channels or reference signals in accordance with the TCI information, based at least in part on whether the TCI information relating to the common beam TCI indication is usable for the one or more channels or reference signals, wherein the one or more channels or reference signals are a proper subset of the plurality of channels or reference signals, as described above.

Process 1000 may include additional aspects, such as any single aspect or any combination of aspects described below and/or in connection with one or more other processes described elsewhere herein.

In a first aspect, the common beam TCI indication is a beam indication for the plurality of channels or reference signals.

In a second aspect, alone or in combination with the first aspect, the TCI information carries downlink control information including the common beam TCI indication, and selectively transmitting or receiving the one or more channels or reference signals further comprises transmitting or receiving the one or more channels or reference signals using a TCI state indicated by the common beam TCI indication, wherein a one-bit indication, carried in the downlink control information, indicates that the common beam TCI indication is usable for the one or more channels or reference signals.

In a third aspect, alone or in combination with one or more of the first and second aspects, the TCI information carries downlink control information including the common beam TCI indication, and process 1000 includes transmitting or receiving the plurality of channels or reference signals using a TCI state indicated by the common beam TCI indication, wherein a one-bit indication, carried in the downlink control information, indicates that the common beam TCI indication is not usable for the one or more channels or reference signals.

In a fourth aspect, alone or in combination with one or more of the first through third aspects, selectively transmitting or receiving the one or more channels or reference signals further comprises selectively transmitting or receiving the one or more channels or reference signals using a TCI state indicated by the common beam TCI indication based at least in part on a preconfiguration or a configured rule indicating whether the common beam TCI indication is usable for the one or more channels or reference signals.

In a fifth aspect, alone or in combination with one or more of the first through fourth aspects, the TCI information includes radio resource control information identifying one or more TCI pools from a selected TCI state can be indicated for an uplink or downlink communication, wherein the plurality of channels or reference signals are associated with a first TCI type and the one or more channels or reference signals are associated with a second TCI type different than the first TCI type.

In a sixth aspect, alone or in combination with one or more of the first through fifth aspects, a same TCI pool, of the one or more TCI pools, is usable for a plurality of TCI types including the first TCI type and the second TCI type.

In a seventh aspect, alone or in combination with one or more of the first through sixth aspects, the first TCI type and the second TCI type are included in a plurality of TCI types, and each TCI type, of the plurality of TCI types, is associated with a different TCI pool of the one or more TCI pools.

In an eighth aspect, alone or in combination with one or more of the first through seventh aspects, the TCI information includes a DCI or MAC based update or activation of a TCI configuration for the one or more channels or reference signals.

In a ninth aspect, alone or in combination with one or more of the first through eighth aspects, the TCI information includes an indication of whether the TCI information is usable for the one or more channels or reference signals, or is usable only for the plurality of channels or reference signals.

In a tenth aspect, alone or in combination with one or more of the first through ninth aspects, process 1000 includes determining whether the TCI information relating to the common beam TCI indication is usable for less than all of the plurality of channels or reference signals based at least in part on a set of identifiers of TCI states indicated by the TCI information, wherein the plurality of channels or reference signals is associated with a first range of identifiers and the one or more channels or reference signals is associated with a second range of identifiers, and selectively updating or activating one or more TCI states of the plurality of channels or reference signals, or the one or more channels or reference signals, based at least in part on whether the set of identifiers are in the first range of identifiers or the second range of identifiers.

In an eleventh aspect, alone or in combination with one or more of the first through tenth aspects, the TCI information includes a simultaneous TCI activation applicable across multiple CCs, and process 1000 includes activating or updating one or more TCI states across the multiple CCs for the one or more channels or reference signals in accordance with the TCI information based at least in part on the simultaneous TCI activation being usable for the one or more channels or reference signals.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
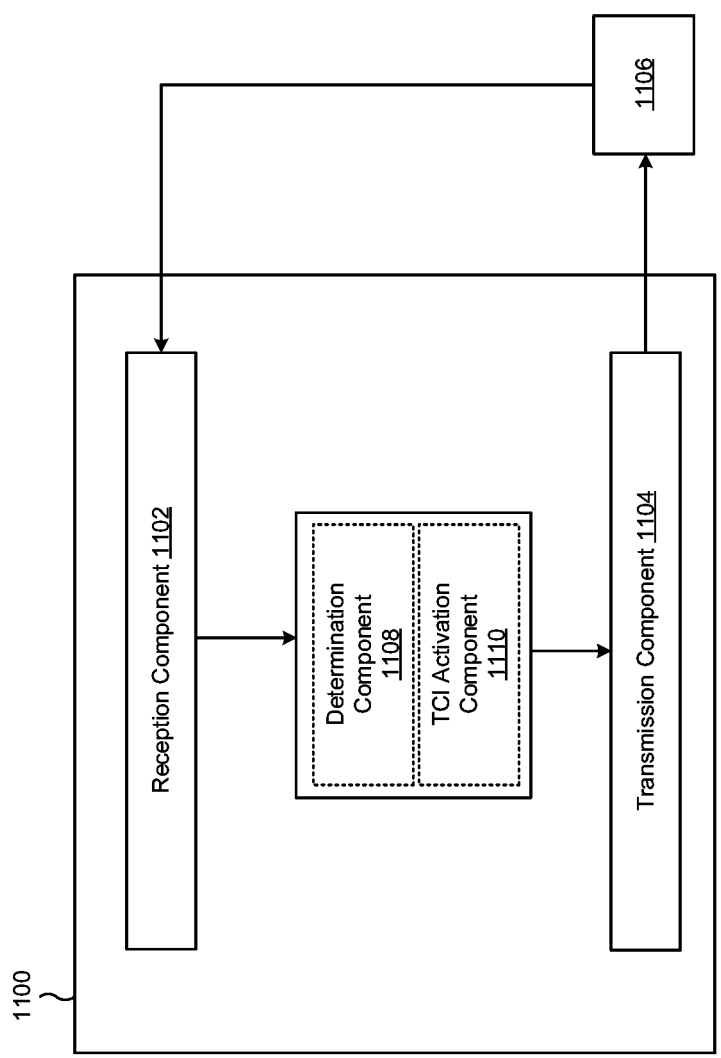
FIGS. 11-12 are block diagrams of example apparatuses for wireless communication, in accordance with various aspects of the present disclosure.

FIG. 11 is a block diagram of an example apparatus 1100 for wireless communication, in accordance with various aspects of the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a determination component 1108 or a TCI activation component 1110, among other examples.

In some aspects, the apparatus 1100 may be configured to perform one or more operations described herein in connection with FIGS. 3-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The reception component 1102 may receive TCI information relating to a common beam TCI indication, the TCI information relating to a plurality of channels or reference signals. The transmission component 1104 may selectively transmit or receive one or more channels or reference signals of the plurality of channels or reference signals in accordance with the TCI information, based at least in part on whether the TCI information relating to the common beam TCI indication is usable for the one or more channels or reference signals of the plurality of channels or reference signals, wherein the one or more channels or reference signals are a proper subset of the plurality of channels or reference signals.

The determination component 1108 may determine whether the TCI information relating to the common beam TCI indication is usable for less than all of the plurality of channels or reference signals based at least in part on a set of identifiers of TCI states indicated by the TCI information, wherein the plurality of channels or reference signals is associated with a first range of identifiers and the one or more channels or reference signals is associated with a second range of identifiers.

The TCI activation component 1110 may selectively update or activate one or more TCI states of the plurality of channels or reference signals, or the one or more channels or reference signals, based at least in part on whether the set of identifiers are in the first range of identifiers or the second range of identifiers.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
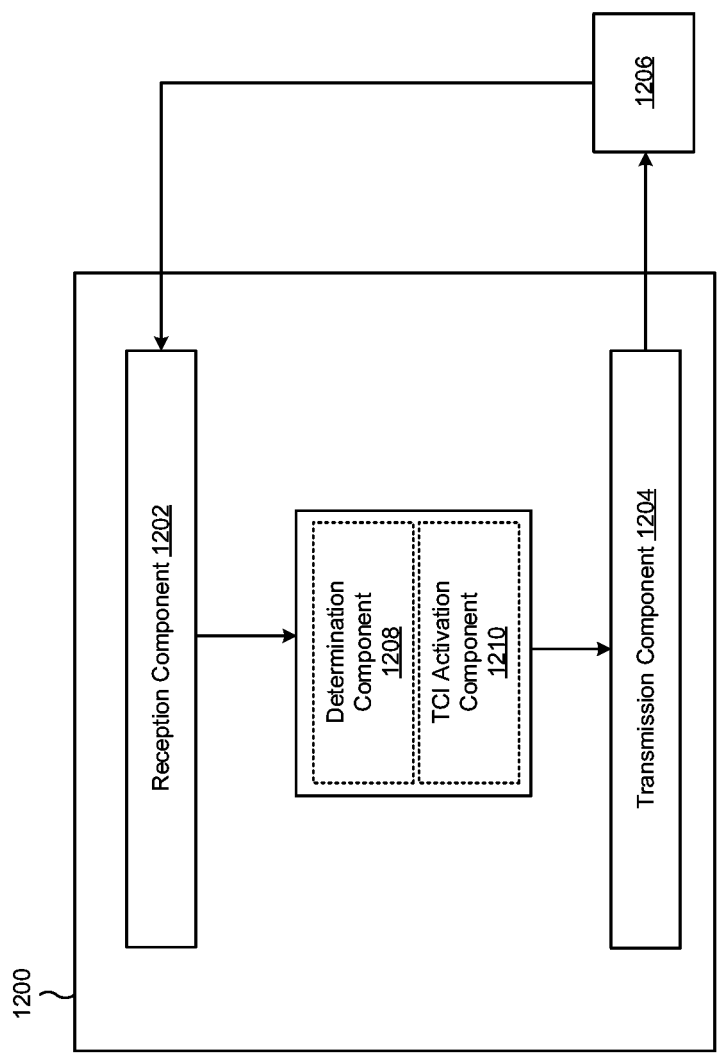

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a determination component 1208 or a TCI activation component 1210, among other examples.

In some aspects, the apparatus 1200 may be configured to perform one or more operations described herein in connection with FIGS. 3-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The transmission component 1204 may transmit TCI information relating to a common beam TCI indication, the TCI information relating to a plurality of channels or reference signals. The transmission component 1204 may selectively transmit or receive one or more channels or reference signals of the plurality of channels or reference signals in accordance with the TCI information, based at least in part on whether the TCI information relating to the common beam TCI indication is usable for the one or more channels or reference signals, wherein the one or more channels or reference signals are a proper subset of the plurality of channels or reference signals.

The determination component 1208 may determine whether the TCI information relating to the common beam TCI indication is usable for less than all of the plurality of channels or reference signals based at least in part on a set of identifiers of TCI states indicated by the TCI information, wherein the plurality of channels or reference signals is associated with a first range of identifiers and the one or more channels or reference signals is associated with a second range of identifiers.

The TCI activation component 1210 may selectively update or activate one or more TCI states of the plurality of channels or reference signals, or the one or more channels or reference signals, based at least in part on whether the set of identifiers are in the first range of identifiers or the second range of identifiers.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some aspects of the present disclosure:

Aspect 1: A method of wireless communication performed by a user equipment (UE), comprising: receiving transmission configuration indicator (TCI) information relating to a common beam TCI indication, the TCI information relating to a plurality of channels or reference signals; and selectively transmitting or receiving one or more channels or reference signals of the plurality of channels or reference signals in accordance with the TCI information, based at least in part on whether the TCI information relating to the common beam TCI indication is usable for the one or more channels or reference signals of the plurality of channels or reference signals, wherein the one or more channels or reference signals are a proper subset of the plurality of channels or reference signals.

Aspect 2: The method of aspect 1, wherein the common beam TCI indication is a beam indication for the plurality of channels or reference signals.

Aspect 3: The method of aspect 2, wherein the TCI information carries downlink control information including the common beam TCI indication, and wherein selectively transmitting or receiving the one or more channels or reference signals further comprises: transmitting or receiving the one or more channels or reference signals using a TCI state indicated by the common beam TCI indication based at least in part on a one-bit indication, carried in the downlink control information, indicating that the common beam TCI indication is usable for the one or more channels or reference signals.

Aspect 4: The method of aspect 2, wherein the TCI information carries downlink control information including the common beam TCI indication, and wherein the method further comprises: transmitting or receiving the plurality of channels or reference signals using a TCI state indicated by the common beam TCI indication based at least in part on a one-bit indication, carried in the downlink control information, indicating that the common beam TCI indication is not usable for the one or more channels or reference signals.

Aspect 5: The method of aspect 2, wherein selectively transmitting or receiving the one or more channels or reference signals further comprises: selectively transmitting or receiving the one or more channels or reference signals using a TCI state indicated by the common beam TCI indication based at least in part on a preconfiguration or a configured rule indicating whether the common beam TCI indication is usable for the one or more channels or reference signals.

Aspect 6: The method any of of aspects 1-5, wherein the TCI information includes radio resource control information identifying one or more TCI pools from which a selected TCI state can be indicated for an uplink or downlink communication, wherein the plurality of channels or reference signals are associated with a first TCI type and the one or more channels or reference signals are associated with a second TCI type different than the first TCI type.

Aspect 7: The method of aspect 6, wherein a same TCI pool, of the one or more TCI pools, is usable for a plurality of TCI types including the first TCI type and the second TCI type.

Aspect 8: The method of aspect 6, wherein the first TCI type and the second TCI type are included in a plurality of TCI types, and wherein each TCI type, of the plurality of TCI types, is associated with a different TCI pool of the one or more TCI pools.

Aspect 9: The method of aspect 6, wherein the TCI information includes information indicating one or more TCI types for which each TCI pool, of the one or more TCI pools, is usable.

Aspect 10: The method of aspect 6, wherein the first TCI type is at least one of: a joint uplink/downlink TCI type, a downlink-only common TCI type, or an uplink-only common TCI type, and wherein the second TCI type is at least one of: a downlink single TCI type, or an uplink single TCI type.

Aspect 11: The method of any of aspects 1-10, wherein the TCI information includes a downlink control information (DCI) or medium access control (MAC) based update or activation of a TCI configuration for the one or more channels or reference signals.

Aspect 12: The method of aspect 10, wherein the TCI information includes an indication of whether the TCI information is usable for the one or more channels or reference signals, or is usable only for the plurality of channels or reference signals.

Aspect 13: The method of aspect 11, wherein the indication comprises one of: a type field of DCI or a MAC control element of the TCI information, wherein the type field indicates whether the TCI information is usable for the one or more channels or reference signals, or is usable only for the plurality of channels or reference signals, or a MAC control element header of the TCI information, wherein the MAC control element header indicates whether the TCI information is usable for less than all of the plurality of channels or reference signals, or is usable only for the plurality of channels or reference signals, based at least in part on whether the MAC control element header is associated with the one or more channels or reference signals or the plurality of channels or reference signals.

Aspect 14: The method of aspect 10, further comprising: determining whether the TCI information relating to the common beam TCI indication is usable for less than all of the plurality of channels or reference signals based at least in part on a set of identifiers of TCI states indicated by the TCI information, wherein the plurality of channels or reference signals is associated with a first range of identifiers and the one or more channels or reference signals is associated with a second range of identifiers; and selectively updating or activating one or more TCI states of the plurality of channels or reference signals, or the one or more channels or reference signals, based at least in part on whether the set of identifiers are in the first range of identifiers or the second range of identifiers.

Aspect 15: The method of any of aspects 1-14, wherein the TCI information includes a simultaneous TCI activation applicable across multiple component carriers (CCs), and wherein the method further comprises: activating or updating one or more TCI states across the multiple CCs for the one or more channels or reference signals in accordance with the TCI information based at least in part on the simultaneous TCI activation being usable for the one or more channels or reference signals.

Aspect 16: The method of aspect 15, wherein the TCI information indicates a single TCI state identifier, and wherein the single TCI state identifier is used to provide a quasi-colocation indication and to determine an uplink transmit spatial filter across the multiple CCs.

Aspect 17: A method of wireless communication performed by a base station, comprising: transmitting transmission configuration indicator (TCI) information relating to a common beam TCI indication, the TCI information relating to a plurality of channels or reference signals; and selectively transmitting or receiving one or more channels or reference signals of the plurality of channels or reference signals in accordance with the TCI information, based at least in part on whether the TCI information relating to the common beam TCI indication is usable for the one or more channels or reference signals, wherein the one or more channels or reference signals are a proper subset of the plurality of channels or reference signals.

Aspect 18: The method of aspect 17, wherein the common beam TCI indication is a beam indication for the plurality of channels or reference signals.

Aspect 19: The method of aspect 18, wherein the TCI information carries downlink control information including the common beam TCI indication, and wherein selectively transmitting or receiving the one or more channels or reference signals further comprises: transmitting or receiving the one or more channels or reference signals using a TCI state indicated by the common beam TCI indication, wherein a one-bit indication, carried in the downlink control information, indicates that the common beam TCI indication is usable for the one or more channels or reference signals.

Aspect 20: The method of aspect 18, wherein the TCI information carries downlink control information including the common beam TCI indication, and wherein the method further comprises: transmitting or receiving the plurality of channels or reference signals using a TCI state indicated by the common beam TCI indication, wherein a one-bit indication, carried in the downlink control information, indicates that the common beam TCI indication is not usable for the one or more channels or reference signals.

Aspect 21: The method of aspect 18, wherein selectively transmitting or receiving the one or more channels or reference signals further comprises: selectively transmitting or receiving the one or more channels or reference signals using a TCI state indicated by the common beam TCI indication based at least in part on a preconfiguration or a configured rule indicating whether the common beam TCI indication is usable for the one or more channels or reference signals.

Aspect 22: The method of any of aspects 17-21, wherein the TCI information includes radio resource control information identifying one or more TCI pools from a selected TCI state can be indicated for an uplink or downlink communication, wherein the plurality of channels or reference signals are associated with a first TCI type and the one or more channels or reference signals are associated with a second TCI type different than the first TCI type.

Aspect 23: The method of aspect 22, wherein a same TCI pool, of the one or more TCI pools, is usable for a plurality of TCI types including the first TCI type and the second TCI type.

Aspect 24: The method of aspect 22, wherein the first TCI type and the second TCI type are included in a plurality of TCI types, and wherein each TCI type, of the plurality of TCI types, is associated with a different TCI pool of the one or more TCI pools.

Aspect 25: The method of any of aspects 17-24, wherein the TCI information includes a downlink control information (DCI) or medium access control (MAC) based update or activation of a TCI configuration for the one or more channels or reference signals.

Aspect 26: The method of aspect 25, wherein the TCI information includes an indication of whether the TCI information is usable for the one or more channels or reference signals, or is usable only for the plurality of channels or reference signals.

Aspect 27: The method of aspect 25, further comprising: determining whether the TCI information relating to the common beam TCI indication is usable for less than all of the plurality of channels or reference signals based at least in part on a set of identifiers of TCI states indicated by the TCI information, wherein the plurality of channels or reference signals is associated with a first range of identifiers and the one or more channels or reference signals is associated with a second range of identifiers; and selectively updating or activating one or more TCI states of the plurality of channels or reference signals, or the one or more channels or reference signals, based at least in part on whether the set of identifiers are in the first range of identifiers or the second range of identifiers.

Aspect 28: The method of any of aspects 17-28, wherein the TCI information includes a simultaneous TCI activation applicable across multiple component carriers (CCs), and wherein the method further comprises: activating or updating one or more TCI states across the multiple CCs for the one or more channels or reference signals in accordance with the TCI information based at least in part on the simultaneous TCI activation being usable for the one or more channels or reference signals.

Aspect 29: An apparatus for wireless communication at a device, comprising a processor; memory coupled with the processor; and instructions stored in the memory and executable by the processor to cause the apparatus to perform the method of one or more aspects of aspects 1-28.

Aspect 30: A device for wireless communication, comprising a memory and one or more processors coupled to the memory, the memory and the one or more processors configured to perform the method of one or more aspects of aspects 1-28.

Aspect 31: An apparatus for wireless communication, comprising at least one means for performing the method of one or more aspects of aspects 1-28.

Aspect 32: A non-transitory computer-readable medium storing code for wireless communication, the code comprising instructions executable by a processor to perform the method of one or more aspects of aspects 1-28.

Aspect 33: A non-transitory computer-readable medium storing a set of instructions for wireless communication, the set of instructions comprising one or more instructions that, when executed by one or more processors of a device, cause the device to perform the method of one or more aspects of aspects 1-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
 receiving transmission configuration indicator (TCI) information relating to a common beam TCI indication, the TCI information relating to a plurality of channels or reference signals; and
 selectively transmitting or receiving one or more channels or reference signals of the plurality of channels or reference signals in accordance with the TCI information, based at least in part on whether the TCI information relating to the common beam TCI indication is usable for the one or more channels or reference signals of the plurality of channels or reference signals,
 wherein the one or more channels or reference signals are a proper subset of the plurality of channels or reference signals.

2. The method of claim 1, wherein the common beam TCI indication is a beam indication for the plurality of channels or reference signals.

3. The method of claim 2, wherein the TCI information carries downlink control information including the common beam TCI indication, and wherein selectively transmitting or receiving the one or more channels or reference signals further comprises:
 transmitting or receiving the one or more channels or reference signals using a TCI state indicated by the common beam TCI indication based at least in part on a one-bit indication, carried in the downlink control information, indicating that the common beam TCI indication is usable for the one or more channels or reference signals.

4. The method of claim 2, wherein the TCI information carries downlink control information including the common beam TCI indication, and wherein the method further comprises:
 transmitting or receiving the plurality of channels or reference signals using a TCI state indicated by the common beam TCI indication based at least in part on a one-bit indication, carried in the downlink control information, indicating that the common beam TCI indication is not usable for the one or more channels or reference signals.

5. The method of claim 2, wherein selectively transmitting or receiving the one or more channels or reference signals further comprises:
 selectively transmitting or receiving the one or more channels or reference signals using a TCI state indicated by the common beam TCI indication based at least in part on a preconfiguration or a configured rule indicating whether the common beam TCI indication is usable for the one or more channels or reference signals.

6. The method of claim 1, wherein the TCI information includes radio resource control information identifying one or more TCI pools from which a selected TCI state can be indicated for an uplink or downlink communication, wherein the plurality of channels or reference signals are associated with a first TCI type and the one or more channels or reference signals are associated with a second TCI type different than the first TCI type.

7. The method of claim 6, wherein a same TCI pool, of the one or more TCI pools, is usable for a plurality of TCI types including the first TCI type and the second TCI type.

8. The method of claim 6, wherein the first TCI type and the second TCI type are included in a plurality of TCI types, and wherein each TCI type, of the plurality of TCI types, is associated with a different TCI pool of the one or more TCI pools.

9. The method of claim 6, wherein the TCI information includes information indicating one or more TCI types for which each TCI pool, of the one or more TCI pools, is usable.

10. The method of claim 6, wherein the first TCI type is at least one of:
 a joint uplink/downlink TCI type,
 a downlink-only common TCI type, or
 an uplink-only common TCI type, and wherein the second TCI type is at least one of:
 a downlink single TCI type, or
 an uplink single TCI type.

11. The method of claim 1, wherein the TCI information includes a downlink control information (DCI) or medium access control (MAC) based update or activation of a TCI configuration for the one or more channels or reference signals.

12. The method of claim 10, wherein the TCI information includes an indication of whether the TCI information is usable for the one or more channels or reference signals, or is usable only for the plurality of channels or reference signals.

13. The method of claim 11, wherein the indication comprises one of:
   a type field of DCI or a MAC control element of the TCI information, wherein the type field indicates whether the TCI information is usable for the one or more channels or reference signals, or is usable only for the plurality of channels or reference signals, or
   a MAC control element header of the TCI information, wherein the MAC control element header indicates whether the TCI information is usable for less than all of the plurality of channels or reference signals, or is usable only for the plurality of channels or reference signals, based at least in part on whether the MAC control element header is associated with the one or more channels or reference signals or the plurality of channels or reference signals.

14. The method of claim 10, further comprising:
   determining whether the TCI information relating to the common beam TCI indication is usable for less than all of the plurality of channels or reference signals based at least in part on a set of identifiers of TCI states indicated by the TCI information, wherein the plurality of channels or reference signals is associated with a first range of identifiers and the one or more channels or reference signals is associated with a second range of identifiers; and
   selectively updating or activating one or more TCI states of the plurality of channels or reference signals, or the one or more channels or reference signals, based at least in part on whether the set of identifiers are in the first range of identifiers or the second range of identifiers.

15. The method of claim 1, wherein the TCI information includes a simultaneous TCI activation applicable across multiple component carriers (CCs), and wherein the method further comprises:
   activating or updating one or more TCI states across the multiple CCs for the one or more channels or reference signals in accordance with the TCI information based at least in part on the simultaneous TCI activation being usable for the one or more channels or reference signals.

16. The method of claim 15 wherein the TCI information indicates a single TCI state identifier, and wherein the single TCI state identifier is used to provide a quasi-colocation indication and to determine an uplink transmit spatial filter across the multiple CCs.

17. A method of wireless communication performed by a base station, comprising:
   transmitting transmission configuration indicator (TCI) information relating to a common beam TCI indication, the TCI information relating to a plurality of channels or reference signals; and
   selectively transmitting or receiving one or more channels or reference signals of the plurality of channels or reference signals in accordance with the TCI information, based at least in part on whether the TCI information relating to the common beam TCI indication is usable for the one or more channels or reference signals, wherein the one or more channels or reference signals are a proper subset of the plurality of channels or reference signals.

18. The method of claim 17, wherein the common beam TCI indication is a beam indication for the plurality of channels or reference signals.

19. The method of claim 18, wherein the TCI information carries downlink control information including the common beam TCI indication, and wherein selectively transmitting or receiving the one or more channels or reference signals further comprises:
   transmitting or receiving the one or more channels or reference signals using a TCI state indicated by the common beam TCI indication, wherein a one-bit indication, carried in the downlink control information, indicates that the common beam TCI indication is usable for the one or more channels or reference signals.

20. The method of claim 18, wherein the TCI information carries downlink control information including the common beam TCI indication, and wherein the method further comprises:
   transmitting or receiving the plurality of channels or reference signals using a TCI state indicated by the common beam TCI indication, wherein a one-bit indication, carried in the downlink control information, indicates that the common beam TCI indication is not usable for the one or more channels or reference signals.

21. The method of claim 18, wherein selectively transmitting or receiving the one or more channels or reference signals further comprises:
   selectively transmitting or receiving the one or more channels or reference signals using a TCI state indicated by the common beam TCI indication based at least in part on a preconfiguration or a configured rule indicating whether the common beam TCI indication is usable for the one or more channels or reference signals.

22. The method of claim 17, wherein the TCI information includes radio resource control information identifying one or more TCI pools from a selected TCI state can be indicated for an uplink or downlink communication, wherein the plurality of channels or reference signals are associated with a first TCI type and the one or more channels or reference signals are associated with a second TCI type different than the first TCI type.

23. The method of claim 22, wherein a same TCI pool, of the one or more TCI pools, is usable for a plurality of TCI types including the first TCI type and the second TCI type.

24. The method of claim 22, wherein the first TCI type and the second TCI type are included in a plurality of TCI types, and wherein each TCI type, of the plurality of TCI types, is associated with a different TCI pool of the one or more TCI pools.

25. The method of claim 17, wherein the TCI information includes a downlink control information (DCI) or medium access control (MAC) based update or activation of a TCI configuration for the one or more channels or reference signals.

26. The method of claim 25, wherein the TCI information includes an indication of whether the TCI information is usable for the one or more channels or reference signals, or is usable only for the plurality of channels or reference signals.

27. The method of claim 25, further comprising:
  determining whether the TCI information relating to the common beam TCI indication is usable for less than all of the plurality of channels or reference signals based at least in part on a set of identifiers of TCI states indicated by the TCI information, wherein the plurality of channels or reference signals is associated with a first range of identifiers and the one or more channels or reference signals is associated with a second range of identifiers; and
  selectively updating or activating one or more TCI states of the plurality of channels or reference signals, or the one or more channels or reference signals, based at least in part on whether the set of identifiers are in the first range of identifiers or the second range of identifiers.

28. The method of claim 17, wherein the TCI information includes a simultaneous TCI activation applicable across multiple component carriers (CCs), and wherein the method further comprises:
  activating or updating one or more TCI states across the multiple CCs for the one or more channels or reference signals in accordance with the TCI information based at least in part on the simultaneous TCI activation being usable for the one or more channels or reference signals.

29. A user equipment (UE) for wireless communication, comprising:
  a memory; and
  one or more processors operatively coupled to the memory, the memory and the one or more processors configured to:
    receive transmission configuration indicator (TCI) information relating to a common beam TCI indication, the TCI information relating to a plurality of channels or reference signals; and
    selectively transmit or receive one or more channels or reference signals of the plurality of channels or reference signals in accordance with the TCI information, based at least in part on whether the TCI information relating to the common beam TCI indication is usable for the one or more channels or reference signals of the plurality of channels or reference signals, wherein the one or more channels or reference signals are a proper subset of the plurality of channels or reference signals.

30. A base station for wireless communication, comprising:
  a memory; and
  one or more processors operatively coupled to the memory, the memory and the one or more processors configured to:
    transmit transmission configuration indicator (TCI) information relating to a common beam TCI indication, the TCI information relating to a plurality of channels or reference signals; and
    selectively transmit or receive one or more channels or reference signals of the plurality of channels or reference signals in accordance with the TCI information, based at least in part on whether the TCI information relating to the common beam TCI indication is usable for the one or more channels or reference signals, wherein the one or more channels or reference signals are a proper subset of the plurality of channels or reference signals.

* * * * *